United States Patent [19]

Muse et al.

[11] Patent Number: 5,153,248

[45] Date of Patent: Oct. 6, 1992

[54] SULFUR VULCANIZED RUBBER COMPOUNDS CONTAINING SILICA AND AROMATIC BISMALEIMIDE

[75] Inventors: Joel Muse, Hudson; Paul H. Sandstrom; Lawson G. Wideman, both of Tallmadge, all of Ohio

[73] Assignee: The Goodyear Tire & Rubber Company, Akron, Ohio

[21] Appl. No.: 774,489

[22] Filed: Oct. 10, 1991

[51] Int. Cl.$^5$ ............................ C08K 5/34; C08K 5/15
[52] U.S. Cl. .................................. 524/105; 524/492; 525/347; 525/375
[58] Field of Search ............... 525/375, 347; 524/105, 524/492

[56] References Cited

U.S. PATENT DOCUMENTS

| | | | |
|---|---|---|---|
| 3,200,152 | 8/1965 | Rupport et al. | 260/570 |
| 3,308,090 | 3/1967 | Falcone et al. | 524/105 |
| 3,334,075 | 8/1967 | Kehn | 525/375 |
| 3,506,624 | 4/1970 | Behrens | 525/347 |
| 4,004,627 | 1/1977 | Sandstrom et al. | 152/355 |
| 4,020,039 | 4/1977 | Dunn et al. | 526/41 |
| 4,248,987 | 2/1981 | Maeda et al. | 525/366 |
| 4,560,729 | 12/1985 | Watanabe et al. | 525/233 |
| 4,654,407 | 5/1987 | Domeier | 526/262 |
| 4,681,928 | 7/1987 | Berger et al. | 525/474 |
| 4,683,270 | 7/1987 | Holloway | 525/347 |
| 4,743,647 | 5/1988 | Domeier | 524/516 |
| 4,803,250 | 2/1989 | Nagasaki et al. | 525/347 |
| 4,818,601 | 4/1989 | Itoh et al. | 428/297 |
| 4,933,385 | 6/1990 | Yamamoto et al. | 524/105 |

FOREIGN PATENT DOCUMENTS 797912 10/1968 Canada .
0268080 5/1988 European Pat. Off. .
7739-1987 1/1987 Japan .
03-41133 2/1991 Japan .
WO8700845 2/1987 PCT Int'l Appl. .
1346455 2/1974 United Kingdom .

*Primary Examiner*—Veronica P. Hoke
*Attorney, Agent, or Firm*—Bruce J. Hendricks

[57] ABSTRACT

The present invention relates to a sulfur vulcanized rubber composition containing a silica filler and a bismaleimide of the formula:

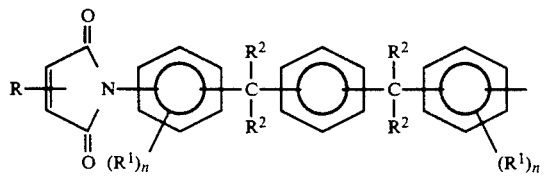

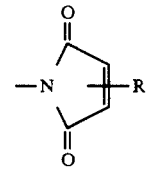

wherein R and $R^1$ are individually selected from the group of radicals consisting of hydrogen, an alkyl having 1 to 4 carbon atoms or a halogen; $R^2$ is selected from the group of radicals consisting of 1 to 12 carbon atoms; and n has a value of from 0 to 4.

The bismaleimide functions as a coupling agent in the silica filled sulfur vulcanized rubber compound.

10 Claims, No Drawings

SULFUR VULCANIZED RUBBER COMPOUNDS CONTAINING SILICA AND AROMATIC BISMALEIMIDE

BACKGROUND OF THE INVENTION

Silane coupling agents are commonly used to reinforce mineral filled elastomers. Silane coupling agents are in principle characterized by dual functionality. One function is an organo-functional group (such as aminoalkyl, mercaptoalkyl, etc.) and the other functional group is a readily hydrolyzable alkoxy group (such as $OCH_3$ or $OCH_2H_5$). In use, the alkoxy groups readily hydrolyze in the presence of moisture typically found on the surface of silica to form silanols that react with or otherwise condense in the presence of silica surface. The organo functional group reacts with the polymer matrix during vulcanization. In sulfur cured elastomers, mercaptosilanes are odoriferous, usually from impurities in the product. Mercaptc-silanes also can act as cure accelerators and may tend to make the rubber compound scorchy. In addition, the alkoxy groups of the coupling agents readily hydrolyze upon storage and when used are not as reactive.

SUMMARY OF THE INVENTION

The present invention relates to a sulfur vulcanized rubber compound comprising a sulfur vulcanized rubber, a precipitated silica filler and an aromatic bismaleimide of the formula:

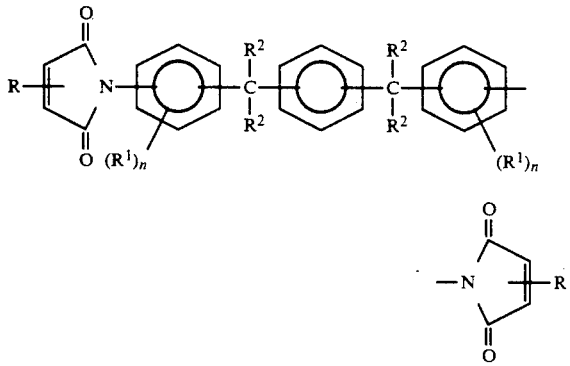

wherein R and $R^1$ are individually selected from the group of radicals consisting of hydrogen, an alkyl having 1 to 4 carbon atoms or a halogen $R^2$ is selected from the group of radicals consisting of 1 to 12 carbon atoms: and n has a value of from 0 to 4.

DETAILED DESCRIPTION OF THE PREFERRED EMBODIMENT

The present invention relates to the incorporation of an aromatic bismaleimide as a silica coupling agent in a silica filled vulcanized rubber. One advantage of the present invention is that the silica filled rubber compounds containing the aromatic bismaleimide exhibits similar increased delta torque, modulus and elongation as silica filled rubber compounds containing silane coupling agents without the inherent problems of odors and loss of reactivity due to hydrolysis. The present invention also relates to a sulfur vulcanizable rubber composition comprising: (1) a sulfur vulcanizable rubber, (2) a sulfur vulcanizing agent, (3) from about 1 to about 50 phr of a silica filler, and (4) from about 0.1 to about 10 phr of bismaleimide of the formula:

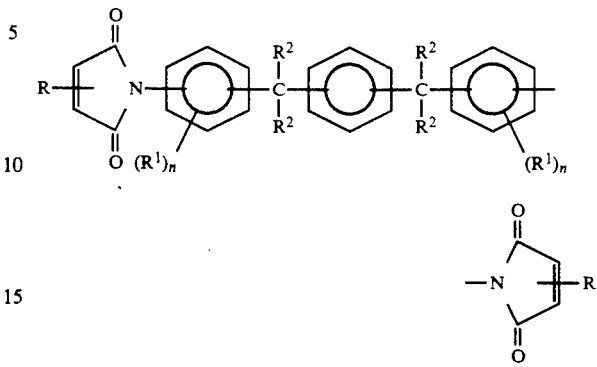

wherein R and $R^1$ are individually selected from the group of radicals consisting of hydrogen, an alkyl having 1 to 4 carbon atoms or a halogen $R^2$ is selected from the group of radicals consisting of 1 to 12 carbon atoms: and n has a value of from 0 to 4.

For purposes of the present invention, the aromatic bismaleimide functions as a silica coupling agent. The term "silica coupling agent" is known to those skilled in the art and is used to describe the reactant which increases the physical interaction between the silica filler and the rubber in the compound. It is believed that this interaction may be via chemical bond, simple chain entanglement or combinations thereof.

Examples of aromatic bismaleimides of the above formula include N,N'-[α,α'-bis(p-maleimidophenyl)-p-diisopropylbenzene], and N,N'-[α,α'-(o-maleimido-phenyl-p-maleimidophenyl)-p-diisopropylbenzene], N,N'-[α,α'-bis(o-maleimidophenyl)-p-diisopropylbenzene].

Aromatic bismaleimides of the above formula are disclosed in U.S. Pat. No. 4,654,407 which is incorporated by reference in its entirety for the purpose of illustrating how to make the aromatic bismaleimides used in the present invention.

The amount of aromatic bismaleimide that is included in the silica filled sulfur vulcanized or vulcanizable rubber composition may vary depending upon the type of rubber and the desired physical properties, i.e., adhesion and tear. Generally speaking, the amount may range from about 0.1 to about 10 parts by weight per 100 parts by weight rubber (phr). Preferably, the amount of the aromatic bismaleimide ranges from about 0.5 to about 5 phr.

The combination of the aromatic bismaleimide with a silica improves the properties of "sulfur vulcanized elastomers or rubbers". The term "sulfur vulcanized elastomer or rubber" as used herein embraces both vulcanized forms of natural and all its various raw and reclaim forms as well as various synthetic rubbers. Representative synthetic polymers include the homopolymerization products of butadiene and its homologues and derivatives, as for example, methylbutadiene, dimethylbutadiene and pentadiene as well as copolymers such as those formed from butadiene or its homologues or derivatives with other unsaturated organic compounds. Among the latter are acetylenes, for example, vinyl acetylene: olefins, for example, isobutylene, which copolymerizes with isoprene to form butyl rubber: vinyl compounds, for example, acrylic acid, acrylonitrile (which polymerizes with butadiene to form NBR), methacrylic acid and styrene, the latter polymerizing with butadiene to form SBR, as well as vinyl esters and various unsaturated aldehydes, ketones and ethers, e.g. acrolein, methyl isopropenyl ketone and vinylethyl ether. Also included are the various synthetic rubbers prepared by the homopolymerization of isoprene and the copolymerization of isoprene and other diolefins in various unsaturated organic compounds. Also included are the synthetic rubbers such as 1,4-cis-polybutadiene and 1,4-cis-polyisoprene and similar synthetic rubbers.

Specific examples of synthetic rubbers include neoprene (polychloroprene), polybutadiene (including trans- and cis-1,4-polybutadiene), polyisoprene (including cis-1,4-polyisoprene), butyl rubber, copolymers of 1,3-butadiene or isoprene with monomers such as styrene, acrylonitrile and methyl methacrylate as well as ethylene/propylene terpolymers, also known as ethylene/propylene/diene monomer (EPDM), and in particular, ethylene/propylene/dicyclopentadiene terpolymers. The preferred synthetic rubbers for use in the present invention are polybutadiene, polyisobutylene, butadiene-styrene copolymers and cis-1,4-polyisoprene.

The silica filler that is included in the sulfur vulcanized rubber composition is a precipitated and generally amorphous silica. The amount of silica may vary depending on the type of rubber and the desired physical properties, i.e., modulus and hardness. Generally speaking, the amount may range from about 1 to about 50 phr. Preferably, the amount of silica that is included ranges from about 5 to about 30 phr. The surface area of the silica generally ranges from about 70 $m^2$ per gram to about 250 $m^2$ per gram. Preferably, the surface area ranges from about 140 $m^2$ per gram to about 160 $m^2$ per gram.

Vulcanization of the rubber compound of the present invention is generally carried out at conventional temperatures ranging from about 100° C. and 200° C. Preferably, the vulcanization is conducted at temperatures ranging from about 110° C. to 180° C. Any of the usual vulcanization processes may be used such as heating in a press or mold, heating with superheated steam or hot air or in a salt bath.

In addition to the aromatic bismaleimide and silica, other rubber additives may also be incorporated in the rubber compound. The additives commonly used in rubber vulcanizates are, for example, carbon black, tackifier resins, processing aids, antioxidants, antiozonants, stearic acid, activators, waxes, oil and peptizing agents. As known to those skilled in the art, depending on the intended use of the rubber compound, certain additives mentioned above are commonly used in conventional amounts. Typical additions of carbon black comprise about 20 to 100 parts by weight of diene rubber (phr), preferably 30 to 70 phr. Typical amounts of tackifier resins comprise about 1 to 5 phr. Typical amounts of antioxidants comprise 1 to about 10 phr. Typical amounts of antiozonants comprise 1 to about 10 phr. Typical amounts of stearic acid comprise 1 to about 2 phr. Typical amounts of zinc oxide comprise 2 to 5 phr. Typical amounts of waxes comprise 1 to 5 phr. Typical amounts of oils comprise 5 to 40 phr. Typical amounts of peptizers comprise 0.1 to 1 phr. The presence and relative amounts of the above additives are not an aspect of the present invention.

The vulcanization of the silica filled rubber compound is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to 8 phr with a range of from 1.0 to 2.25 being preferred.

Accelerators are conventionally used to control the time and/or temperature required for vulcanization and to improve the properties of the vulcanizate. In some instances, a single accelerator system may be used, i.e., primary accelerator. Conventionally, a primary accelerator is used in amounts ranging from about 0.5 to 2.0 phr. In another instance, combinations of two or more accelerators may be used which may consist of a primary accelerator which is generally used in the large amount (0.5 to 2.0 phr), and a secondary accelerator which is generally used in smaller amounts (0.01–0.50 phr) in order to activate and to improve the properties of the vulcanizate. Combinations of these accelerators have been known to produce a synergistic effect of the final properties and are somewhat better than those produced by use of either accelerator alone. In addition, delayed action accelerators may be used which are not effected by normal processing temperatures but produce satisfactory cures at ordinary vulcanizate temperatures. Suitable types of accelerators that may be used include amines, disulfides, guanidines, thioureas, thiazoles, thiurams, sulfenamides, dithiocarbamates and xanthates. Preferably, the primary accelerator is a sulfenamide. If a secondary accelerator is used, the secondary accelerator is preferably a guanidine, dithiocarbamate or thiuram compound.

The silica filled rubber compounds containing the aromatic bismaleimides may be used in the preparation of tires, motor mounts, rubber bushings, power belts, printing rolls, rubber shoe heels and soles, rubber floor tiles, caster wheels, elastomer seals and gaskets, conveyor belt covers, wringers, hard rubber battery cases, automobile floor mats, mud flaps for trucks, ball mill liners, and the like. Preferably, the rubber vulcanizates are used in tread compounds for tires.

Cure properties were determined using a Monsanto oscillating disc rheometer which was operated at a temperature of 150° C. and at a frequency of 11 hertz. A description of oscillating disc rheometers can be found in the Vanderbilt Rubber Handbook edited by Robert 0. Babbit (Norwalk, CT, R. T. Vanderbilt Company, Inc., 1978), pages 583–591. The use of this cure meter and standardized values read from the curve are specified in ASTM D-2084. A typical cure curve obtained on an oscillating disc rheometer is shown on page 588 of the 1978 edition of the Vanderbilt Rubber Handbook.

In such an oscillating disc rheometer, compounded rubber samples are subjected to an oscillating shearing action of constant amplitude. The torque of the oscillating disc embedded in the stock that is being tested that is required to oscillate the rotor at the vulcanization temperature is measured. The values obtained using this cure test are very significant since changes in the rubber or the compounding recipe are very readily detected. It is obvious that it is normally advantageous to have a fast cure rate.

The following tables report cure properties that were determined from cure curves that were obtained for the two rubber formulations that were prepared. These properties include a torque minimum (Min Torque), a torque maximum (Max Torque), minutes to 25% of the torque increase (t25 min.), and minutes to 90% of the torque increase (t90 min.).

Peel adhesion testing was done to determine the interfacial adhesion between various rubber formulations that were prepared. The interfacial adhesion was determined by pulling one compound away from another at a right angle to the untorn test specimen with the two ends being pulled apart at a 180° angle to each other using an Instron machine The area of contact was determined from placement of a Mylar sheet between the compounds during cure. A window in the Mylar allowed the two materials to come into contact with each other during testing.

Adhesion to nylon and Flexten was evaluated using the Tire Cord Adhesion Test (TCAT). Wire adhesion to tire wire was also evaluated using the TCAT test. Samples were prepared and tested according to the procedures described by D. W. Nicholson, D. I. Livingston, and G. S. Fielding-Russell, *Tire Science and Technology* (1978) 6, 114: G. S. Fielding-Russell and D. I. Livingston, *Rubber Chemistry and Technology* (1980) 53, 950: and R. L. Rongone, D. W. Nicholson and R. E. Payne, U.S. Pat. No. 4,095,465 (June 20, 1978).

Shore Hardness was determined in accordance with ASTM-1415.

The following examples are presented in order to illustrate but not limit the present invention.

EXAMPLE 1

Physical Testing

Table I below shows the basic rubber compound that was used in this example. The rubber compound was prepared in a 3-stage Banbury mix. All parts and percentages are by weight unless otherwise noted. The cure data as well as other physical data for each sample are listed in Table II.

TABLE I

|  | Control Sample 1 | Control Sample 2 | Sample 3 |
|---|---|---|---|
| 1st Non-Productive |  |  |  |
| Natural Rubber | 100.0 | 100.0 | 100.0 |
| Carbon Black | 20.0 | 20.0 | 20.0 |
| 2nd Non-Productive |  |  |  |
| Carbon Black | 15.0 | 15.0 | 15.0 |
| Silane Coupling Agent[1] | 0 | 3.0 | 0 |
| Aromatic Bismaleimide | 0 | 0 | 2.0 |
| Silica[2] | 15.0 | 15.0 | 15.0 |
| Processing Oil | 5.0 | 5.0 | 5.0 |
| Stearic Acid | 1.0 | 1.0 | 1.0 |
| Zinc Oxide | 5.0 | 5.0 | 5.0 |
| Antioxidant[3] | 2.0 | 2.0 | 2.0 |
| Productive |  |  |  |
| Sulfur, Retarder, Accelerator (Sulfenamide) | 1.0/1.5/0.2 | 1.0/1.5/0.2 | 1.0/1.5/0.2 |

[1]bis-(3-triethoxysilylpropyl)tetrasulfide (50% active)
[2]HiSil ™, a precipitated silica commercially available from PPG Industries.
[3]polymerized 1,2-dihydro-2,2,4-trimethylquinoline

TABLE II

|  | Sample 1 | Sample 2 | Sample 3 |
|---|---|---|---|
| Silane coupling agent | 0 | 3.0 | 0 |
| Aromatic bismaleimide | 0 | 0 | 2.0 |
| Rheometer (150° C.) |  |  |  |
| Max. Torque | 32.3 | 34.8 | 34.5 |
| Min. Torque | 10.7 | 10.4 | 10.8 |
| t90, minutes | 20.3 | 17.0 | 24.5 |
| t25, minutes | 14.6 | 11.6 | 17.4 |
| Stress-Strain |  |  |  |
| Tensile Strength, MPa | 17.6 | 17.5 | 18.9 |
| Elongation at Break, % | 563 | 511 | 547 |
| 100% Modulus, MPa | 1.25 | 1.50 | 1.43 |
| 300% Modulus, MPa | 6.53 | 8.45 | 7.82 |
| Compression Modulus |  |  |  |
| 10%, pounds | 9.0 | 9.7 | 11.0 |
| 20%, pounds | 17.5 | 19.5 | 20.5 |
| 30%, pounds | 27.5 | 31.0 | 33.0 |
| Rebound (ASTM D1054) |  |  |  |
| 100° C., % | 58.2 | 61.0 | 60.5 |
| Room Temperature, % | 50.5 | 52.4 | 52.1 |
| Wire Adhesion (Room Temperature) |  |  |  |
| Original Pullout Force, Newtons | 474 | 287 | 513 |
| Adhesion (Newtons) |  |  |  |
| Nylon Cord | 88 | 110 | 93 |
| Flexten Cord | 88 | 88 | 100 |
| Peel Adhesion (95° C.) |  |  |  |
| To Itself, Newtons | 269 | 211 | 209 |
| Rheovibron |  |  |  |
| E' at 60° C., MPa | 7.84 | 7.15 | 11.6 |
| Tan Delta at 60° C. | .138 | .129 | .125 |
| Hardness, Shore A |  |  |  |
| 100° C. | 46.6 | 50.0 | 50.8 |
| Room Temperature | 51.7 | 55.1 | 55.7 |

What is claimed is:

1. A sulfur vulcanized rubber compound comprising a sulfur vulcanized rubber, a precipitated silica filler and an aromatic bismalermide of the formula:

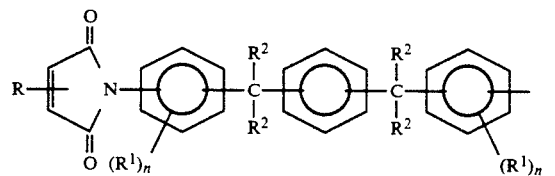

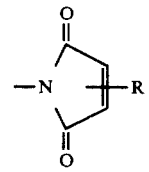

wherein R and $R^1$ are individually selected from the group of radicals consisting of hydrogen, an alkyl having 1 to 4 carbon atoms or a halogen: $R^2$ is selected from the group of radicals consisting of 1 to 12 carbon atoms: and n has a value of from 0 to 4.

2. The compound of claim 1 wherein R are each hydrogen, n is 0 and $R^2$ are each an alkyl having 1 carbon atom.

3. The compound of claim 1 wherein the amount of precipitated silica ranges from about 5 to about 30 phr.

4. The compound of claim 1 wherein the amount of aromatic bismaleimide ranges from about 0.5 to about 5 phr.

5. The compound of claim 1 wherein the precipitated silica has a surface area ranging from about 70 m² per gram to 250 m² per gram.

6. A sulfur vulcanizable compound comprising a sulfur vulcanizable rubber, a sulfur vulcanizing agent, a precipitated silica and an aromatic bismaleimide of the formula:

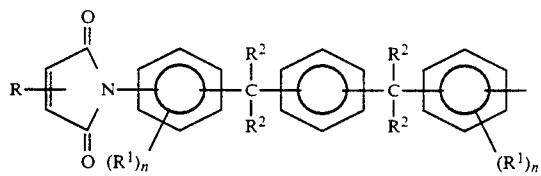

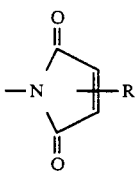

wherein R and $R^1$ are individually selected from the group of radicals consisting of hydrogen, an alkyl having 1 to 4 carbon atoms or a halogen $R^2$ is selected from the group of radicals consisting of 1 to 12 carbon atoms: and n has a value of from 0 to 4.

7. The compound of claim 6 wherein R are each hydrogen, n is 0 and $R^2$ are each an alkyl having 1 carbon atom.

8. The compound of claim 6 wherein the amount of precipitated silica ranges from about 5 to about 30

9. The compound of claim 6 wherein the amount of aromatic bismaleimide ranges from about 0.5 to about 5 phr.

10. The compound of claim 6 wherein the precipitated silica has a surface area ranging from about 70 $m^2$ per gram to 250 $m^2$ per gram.

* * * * *